US008498198B2

(12) United States Patent
Kim et al.

(10) Patent No.: US 8,498,198 B2
(45) Date of Patent: Jul. 30, 2013

(54) METHOD AND APPARATUS OF TRANSMITTING SCHEDULING REQUEST IN WIRELESS COMMUNICATION SYSTEM

(71) Applicant: LG Electronics Inc., Seoul (KR)

(72) Inventors: Hak-seong Kim, Seoul (KR); Young Woo Yun, Anyang-si (KR); Dae Won Lee, Seoul (KR); Joon Kui Ahn, Seongnam-si (KR); Bong Hoe Kim, Seongnam-si (KR); Ki Jun Kim, Seongnam-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/735,985

(22) Filed: Jan. 7, 2013

(65) Prior Publication Data

US 2013/0121290 A1 May 16, 2013

Related U.S. Application Data

(63) Continuation of application No. 12/537,169, filed on Aug. 6, 2009, now Pat. No. 8,374,076.

(60) Provisional application No. 61/088,343, filed on Aug. 12, 2008, provisional application No. 61/090,610, filed on Aug. 20, 2008, provisional application No. 61/102,438, filed on Oct. 3, 2008.

(30) Foreign Application Priority Data

Feb. 25, 2009 (KR) ........................ 10-2009-0015992

(51) Int. Cl.
*H04J 11/00* (2006.01)
(52) U.S. Cl.
USPC .......................................... 370/210; 375/260

(58) Field of Classification Search
None
See application file for complete search history.

(56) References Cited

U.S. PATENT DOCUMENTS

| 8,059,524 B2 | 11/2011 | Bertrand et al. |
| 2008/0080423 A1 | 4/2008 | Kolding et al. |
| 2009/0109908 A1 | 4/2009 | Bertrand et al. |
| 2010/0040005 A1 | 2/2010 | Kim et al. |
| 2010/0135273 A1 | 6/2010 | Kim |

FOREIGN PATENT DOCUMENTS

| CN | 1863181 | 11/2006 |
| KR | 10-2008-0073645 | 8/2008 |
| RU | 2341029 | 12/2008 |
| WO | 2006/012405 | 2/2006 |
| WO | 2006/107835 | 10/2006 |
| WO | 2007/051181 | 5/2007 |
| WO | 2008/050425 | 5/2008 |
| WO | 2008/120925 | 10/2008 |

OTHER PUBLICATIONS

H.S. Kim, "A Standard about a Physical Layer Controlling Signal of LTE Uplink," IITA Standard Weekly, vol. 2007, No. 37, 2007, 11 pages.

(Continued)

*Primary Examiner* — Alex Skripnikov
(74) *Attorney, Agent, or Firm* — Lee, Hong, Degerman, Kang & Waimey

(57) ABSTRACT

A method and an apparatus of transmitting scheduling request (SR) in a wireless communication system are provided. The method includes configuring a physical uplink control channel (PUCCH) for a SR in a subframe, the subframe comprising a plurality of single carrier-frequency division multiple access (SC-FDMA) symbols, wherein one SC-FDMA symbol on the PUCCH is punctured and transmitting the SR on the PUCCH in the subframe.

6 Claims, 19 Drawing Sheets

OTHER PUBLICATIONS

Samsung, "Uplink channel sounding RS structure," R1-072229, 3GPP TSG RAN WG1 Meeting #49, May 7-11, 2007, 4 pages.
3GPP TS 36.213 V8.3.0, "Evolved universal terrestrial radio access (E-UTRA)," May 2008, 4 pages.
Samsung, "Uplink channel sounding RS structure," R1-073116, 3GPP TSG RAN WG1 Meeting #49bis, Jun. 25-29, 2007, 4 pages.
Japanese Patent Office Application Serial No. 2011-522898, Non-Final Office Action dated Oct. 9, 2012, 3 pages.
IP Australia Application Serial No. 2009280498, Office Action dated Dec. 4, 2012, 3 pages.
Russian Federation for Intellectual Property Application Serial No. 2011109152/07, Notice of Allowance dated Nov. 9, 2012, 12 pages.
3GPP, TS 36.213 V8.5.0 3rd Generation Partnership Project; Technical Specification Group Radio Access Network; Evolved Universal Terrestrial Radio Access (E-UTRA); Physical layer procedures (Release 8), Dec. 2008, 74 pages.
Nokia, "Data-non-associated control signal transmission with UL data," R1-071000, 3GPP TSG RAN WG1 Meeting #48, Feb. 2007, 5 pages.
The State Intellectual Property Office of the People's Republic of China Application Serial No. 200980135426.5, Office Action dated Apr. 3, 2013, 6 pages.

FIG. 7

| 0 | 1 | 2 | 3 | 4 | 5 | 6 | 0 | 1 | 2 | 3 | 4 | 5 | 6 |
|---|---|---|---|---|---|---|---|---|---|---|---|---|---|
| w(0)* d(0)* r(n,0) | w(1)* d(0)* r(n,1) | RS | RS | RS | w(2)* d(0)* r(n,2) | w(3)* d(0)* r(n,3) | w(0)* d(0)* r(n,4) | w(1)* d(0)* r(n,5) | RS | RS | RS | w(2)* d(0)* r(n,6) | w(3)* d(0)* r(n,7) |

Symbol d(0)

1st slot (n_s=0) | 2nd slot (n_s=1)

Subframe

FIG. 9
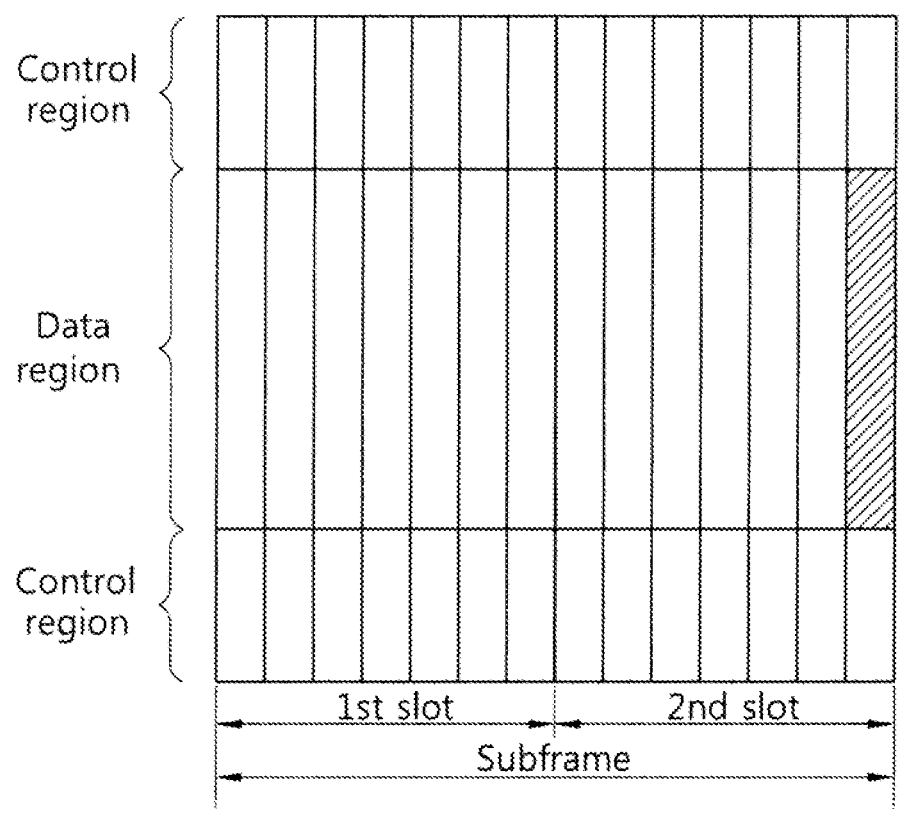

METHOD AND APPARATUS OF TRANSMITTING SCHEDULING REQUEST IN WIRELESS COMMUNICATION SYSTEM

CROSS-REFERENCE TO RELATED APPLICATIONS

This application is a continuation of U.S. patent application Ser. No. 12/537,169, filed on Aug. 6, 2009, now U.S. Pat. No. 8,374,076, which claims the benefit of earlier filing date and right of priority to Korean Patent Application No. 10-2009-15992, filed on Feb. 25, 2009, and also claims the benefit of U.S. Provisional application Ser. No. 61/088,343, filed on Aug. 12, 2008, U.S. Provisional application Ser. No. 61/090,610, filed on Aug. 20, 2008, and U.S. Provisional Application Ser. No. 61/102,438, filed Oct. 3, 2008, the content of all of which are hereby incorporated by reference herein in their entireties.

BACKGROUND OF THE INVENTION

1. Field of the Invention

The present invention relates to wireless communications, and more particularly, to a method and an apparatus of transmitting a scheduling request (SR) in a wireless communication system.

2. Related Art

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

In general, the wireless communication system is a multiple access system capable of supporting communication with multiple users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a code in the CDMA system, and a subcarrier and a time in the OFDMA system.

While having almost the same complexity with the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a $3^{rd}$ generation partnership project (3GPP) long term evolution (LTE) as disclosed in section 5 of the 3GPP TS 36.211 V8.2.0 (2008-03) "Technical Specification Group Radio Access Network; Evolved Universal Terrestrial Radio Access (E-UTRA); Physical channels and modulation (Release 8)".

Various uplink control information are transmitted on an uplink control channel. Examples of the uplink control information include a hybrid automatic repeat request (HARQ) acknowledgement (ACK)/not-acknowledgement (NACK), a channel quality indicator (CQI) indicating downlink channel quality, a scheduling request (SR) requesting resource allocation for uplink transmission, etc.

Meanwhile, the UE transmits a sounding reference signal (SRS) to a base station (BS). The SRS is a reference signal transmitted for uplink scheduling by the UE to the BS. The BS estimates an uplink channel by using the received SRS, and uses the estimated uplink channel in the uplink scheduling.

However, if SC-FDMA is used in uplink transmission, to maintain a single carrier property, the UE cannot simultaneously transmit different signals even when using different frequency regions. This may cause ineffective use of limited radio resources.

Accordingly, there is a need for a method of transmitting an SR for the effective use of limited resources.

SUMMARY OF THE INVENTION

The present invention provides a method and an apparatus of transmitting a scheduling request (SR) in a wireless communication system.

In one aspect, a method of transmitting scheduling request (SR) in a wireless communication system, carried in a user equipment, is provided. The method includes configuring a physical uplink control channel (PUCCH) for a SR in a subframe, the subframe comprising a plurality of single carrier-frequency division multiple access (SC-FDMA) symbols, wherein one SC-FDMA symbol on the PUCCH is punctured and transmitting the SR on the PUCCH in the subframe.

The method may further include transmitting a sounding reference signal (SRS) in the subframe, wherein the punctured SC-FDMA symbol is corresponding to a location on which the SRS is transmitted.

The method may further include receiving a simultaneous transmission indicator from a base station (BS), the simultaneous transmission indicator indicating whether the SC-FDMA symbol on the PUCCH is punctured.

The method may further include receiving a specific subframe configuration parameter from an BS, the specific subframe configuration parameter indicating the subframe in which the SC-FDMA symbol on the PUCCH is punctured.

Preferably, the punctured SC-FDMA symbol is the last SC-FDMA symbol of the subframe.

Preferably, the subframe is composed of two slots, and the PUCCH uses one resource block in each of the two slots in the subframe.

Preferably, each of resource blocks used for the PUCCH in the each of the two slots is different in a frequency domain.

Preferably, the SR is spread by orthogonal sequences with different lengths in the each of the two slots in the subframe.

Preferably, the length of the first orthogonal sequence for one slot including the punctured SC-FDMA symbol is shorter than that of the second orthogonal sequence for another slot.

In another aspect, a user equipment (UE) is provided. The UE includes a radio frequency (RF) unit transmitting and/or receiving a radio signal and a processor coupled with the RF unit and configured to configure a PUCCH for a SR in a subframe, the subframe comprising a plurality of SC-FDMA symbols, wherein one SC-FDMA symbol on the PUCCH is punctured and transmit the SR on the PUCCH in the subframe.

In still another aspect, a method of requesting uplink resource in a wireless communication system, carried in a user equipment, is provided. The method includes transmitting a SR in a subframe, the subframe comprising a first slot and a second slot, each of the first slot and the second slot comprising a plurality of SC-FDMA symbols, wherein a SC-FDMA symbol in the second slot is punctured so that a SRS is transmitted in the punctured SC-FDMA symbol and receiving a uplink resource as a response of the SR.

Preferably, the first slot and the second slot are consecutive.

A method and an apparatus of effectively transmitting a scheduling request (SR) are provided. Accordingly, overall system performance can be improved.

BRIEF DESCRIPTION OF THE DRAWINGS

FIG. 7 shows an example of physical uplink control channel (PUCCH) format 1/1a/1b transmission if a normal cyclic prefix (CP) is used.

FIG. 9 shows an example of a subframe for transmitting a sounding reference signal (SRS).

DESCRIPTION OF EXEMPLARY EMBODIMENTS

The technique described below can be used in various wireless access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/ General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink.

For clarity, the following description will focus on the 3GPP LTE. However, the technical features of the present invention are not limited thereto.

Figure 1:
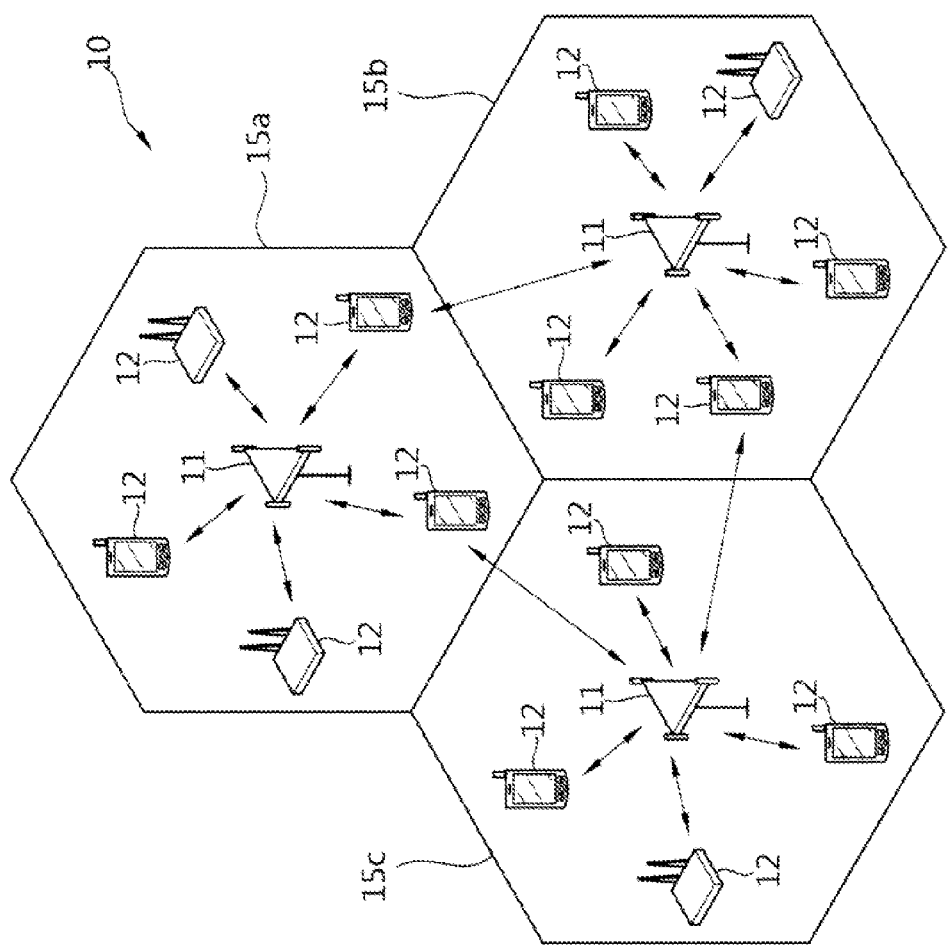
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

The wireless communication system can support a UL and/or DL hybrid automatic repeat request (HARQ). In addition, a channel quality indicator (CQI) can be used for link adaptation.

Figure 2:
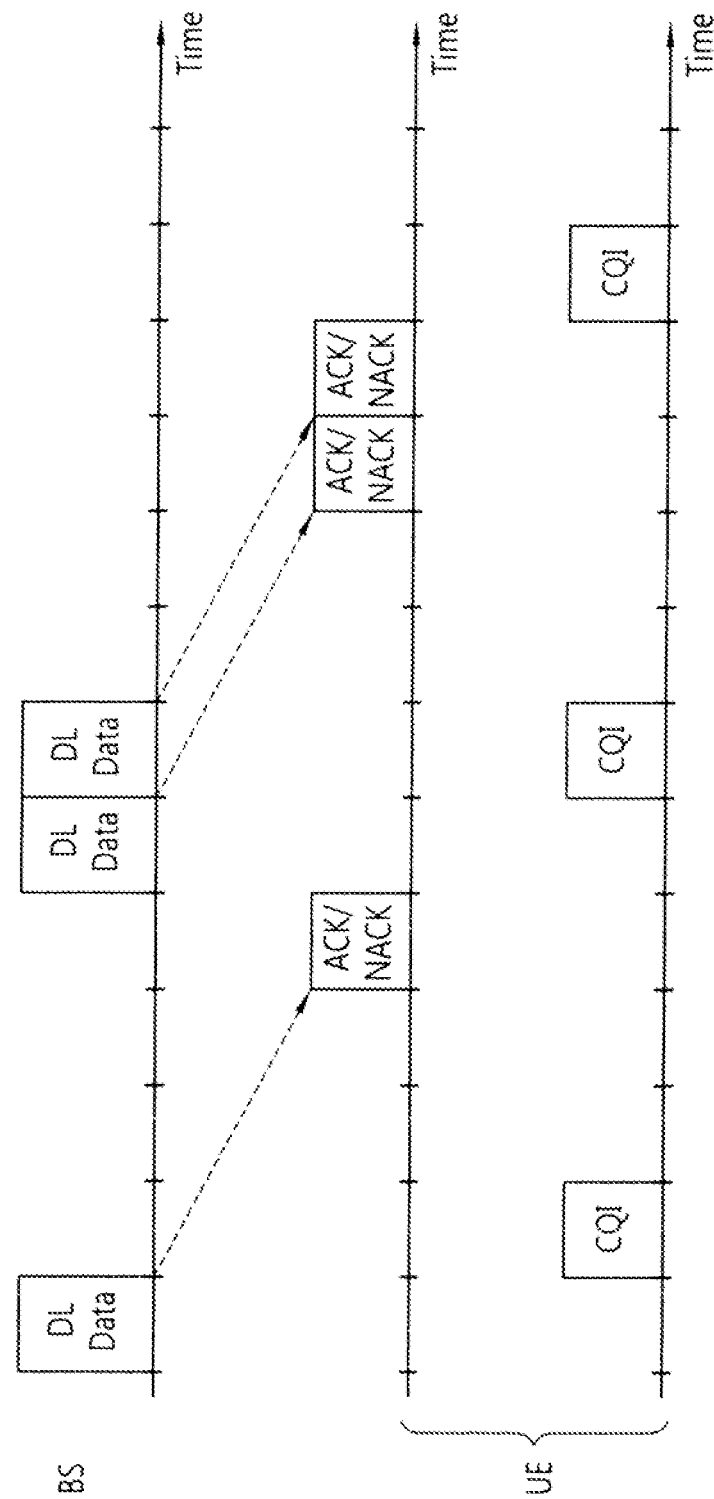
FIG. 2 shows transmission of a hybrid automatic repeat request (HARQ) acknowledgement (ACK)/not-acknowledgment (NACK) and a channel quality indicator (CQI).

FIG. 2 shows transmission of HARQ acknowledgement (ACK)/not-acknowledgment (NACK) and a CQI.

Referring to FIG. 2, upon receiving DL data from a BS, a UE transmits the HARQ ACK/NACK after a specific time elapses. The DL data may be transmitted on a physical downlink shared channel (PDSCH) indicated by a physical downlink control channel (PDCCH). The HARQ ACK/NACK is ACK if the DL data is successfully decoded. The HARQ ACK/NACK is NACK if the DL data is unsuccessfully decoded. Upon receiving the NACK, the BS can retransmit the DL data until the ACK is received or until retransmission is performed the number of times corresponding to a maximum number of retransmissions.

Resource allocation or a transmission time of the HARQ ACK/NACK for the DL data may be dynamically reported by the BS by using signaling, or may be predetermined according to the resource allocation or the transmission time of the DL data. For example, in a frequency division duplex (FDD) system, if the PDSCH is received in an $n^{th}$ subframe, the HARQ ACK/NACK for the PDSCH can be transmitted on a physical uplink control channel (PUCCH) in an $(n+4)^{th}$ subframe.

The UE can report a CQI periodically and/or aperiodically to the BS by measuring a DL channel condition. The BS can perform DL scheduling by using the CQI. The BS can report a CQI transmission time or resource allocation information to the UE.

Figure 3:
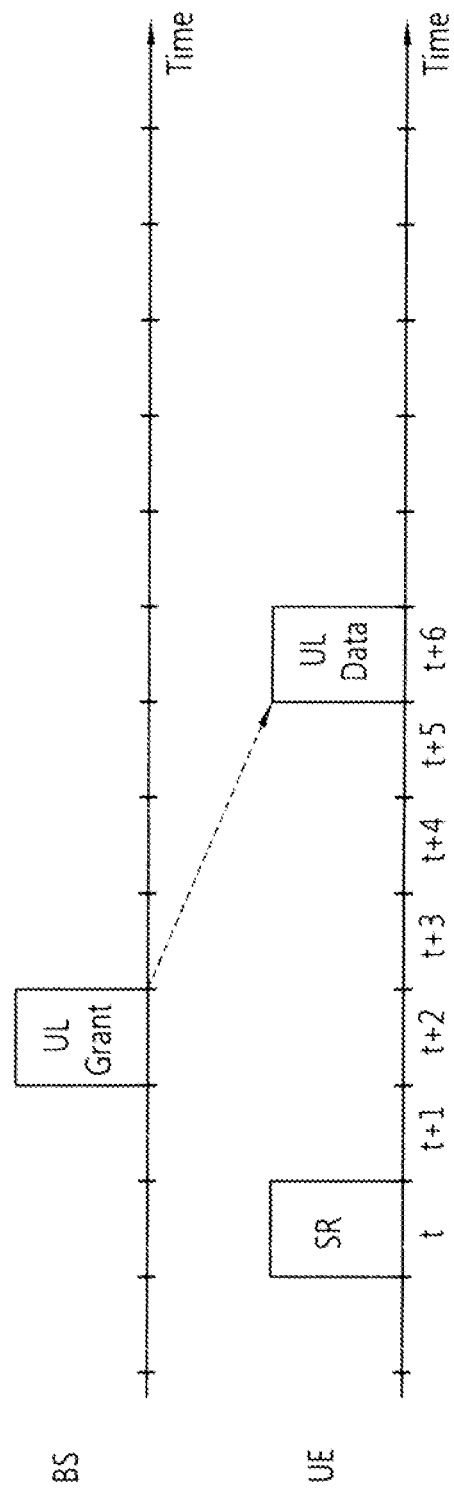
FIG. 3 shows uplink transmission.

FIG. 3 shows UL transmission.

Referring to FIG. 3, for UL transmission, a UE first transmits a scheduling request (SR) to a BS. The SR is used if the UE requests the BS to allocate a UL radio resource. The SR is a sort of preliminary information exchange for data exchange. In order for the UE to transmit UL data to the BS, radio resource allocation is first requested by using the SR. The BS can report an SR transmission time or resource allocation information for the SR to the UE. The SR may be transmitted periodically. The BS can report a transmission period of the SR to the UE.

In response to the SR, the BS transmits a UL grant to the UE. The UL grant may be transmitted on a PDCCH. The UL grant includes UL radio resource allocation. The UE transmits the UL data by using an allocated radio resource.

As shown in FIGS. 2 and 3, the UE can transmit UL control information (i.e., HARQ ACK/NACK, CQI, and SR) at a given transmission time. The type and size of the control information may vary depending on systems, and the technical features of the present invention are not limited thereto.

Figure 4:
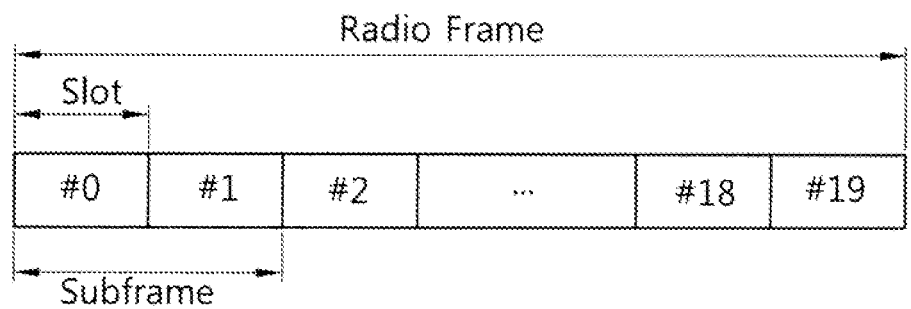
FIG. 4 shows a structure of a radio frame in a $3^{rd}$ generation partnership project (3GPP) long term evolution (LTE).

FIG. 4 shows a structure of a radio frame in a 3GPP LTE.

Referring to FIG. 4, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is shown for exemplary purposes only. Thus, the number of subframes included in the radio frame or the number of slots included in the subframe may change variously.

Figure 5:
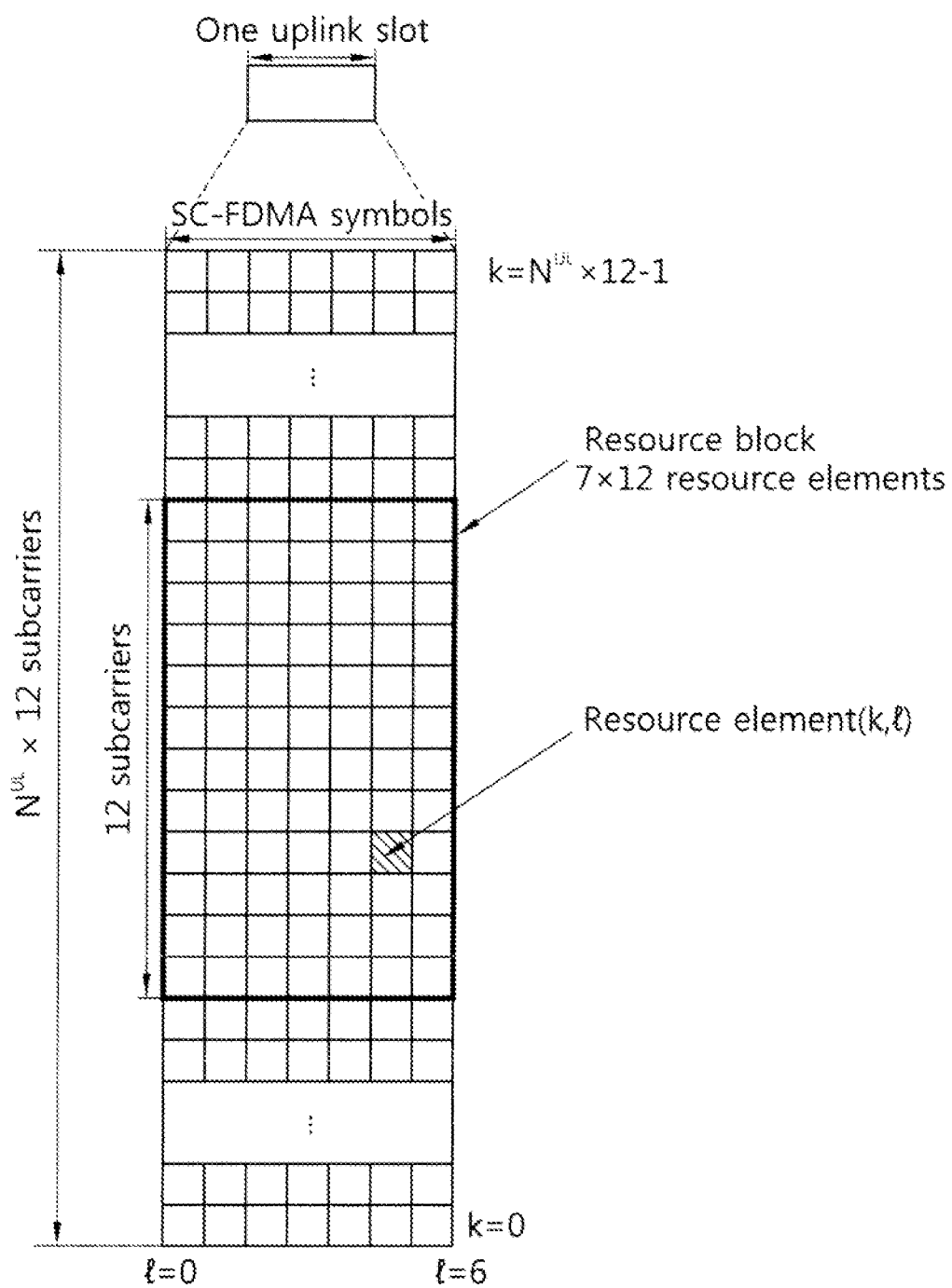
FIG. 5 shows an example of a resource grid for one uplink slot in a 3GPP LTE.

FIG. 5 shows an example of a resource grid for one UL slot in a 3GPP LTE.

Referring to FIG. 5, the UL slot includes a plurality of SC-FDMA symbols in a time domain and $N^{UL}$ resource blocks (RBs) in a frequency domain. The SC-FDMA symbol is for expressing one symbol period, and may be referred to as an OFDMA symbol or a symbol duration according to systems. The RB is a resource allocation unit and includes a plurality of subcarriers in the frequency domain. The number of RBs $N^{UL}$ included in the UL slot depends on a UL transmission bandwidth configured in a cell. In the 3GPP LTE, the number $N^{UL}$ may be any one value in the range of 60 to 110.

Each element on the resource grid is referred to as a resource element. The resource element on the resource grid can be identified with an index pair (k, l) within a slot. Herein, k (k=0, . . . , $N^{UL} \times 12-1$) denotes a subcarrier index in the frequency domain, and l (l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain, this is for exemplary purposes only. Thus, the number of SC-FDMA symbols and the number of subcarriers in the RB are not limited thereto. The number of subcarriers or the number of SC-FDMA symbols included in the RB may change variously. The number of SC-FDMA symbols may change according to a length of a cyclic prefix (CP). For example, if a normal CP is used, the number of SC-FDMA symbols is 7, and if an extended CP is used, the number of SC-FDMA symbols is 6.

The resource grid for one UL slot for the 3GPP LTE of FIG. 5 can also apply to a resource grid for a DL slot. In this case, however, the DL slot includes a plurality of orthogonal frequency division multiplexing (OFDM) symbols in the time domain.

Figure 6:
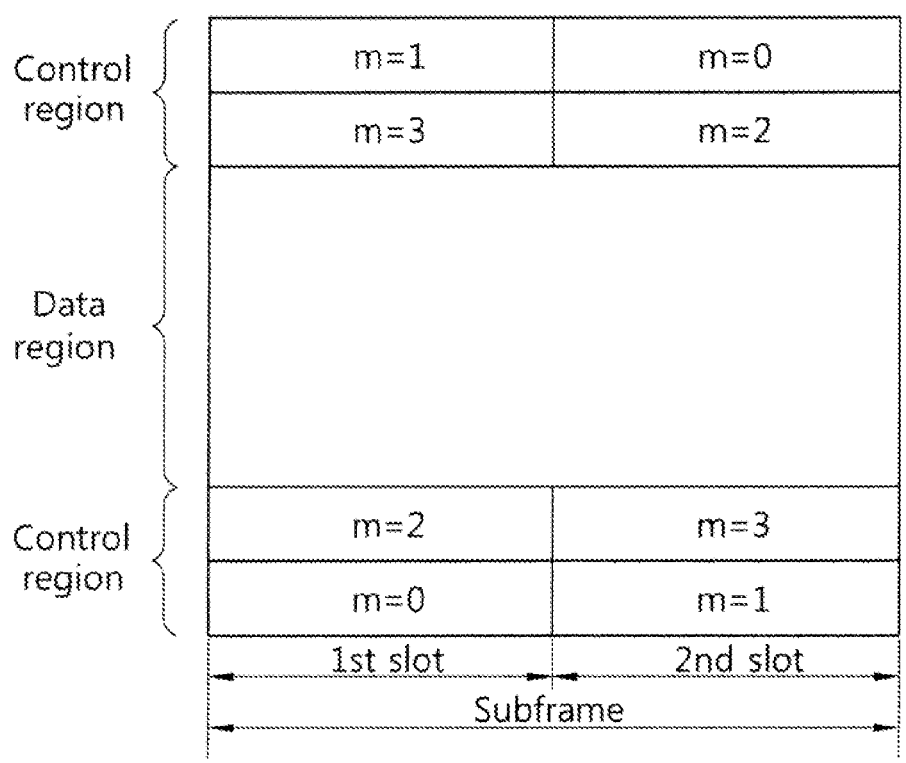
FIG. 6 shows an exemplary structure of an uplink subframe in a 3GPP LTE.

FIG. 6 shows an exemplary structure of a UL subframe in a 3GPP LTE.

Referring to FIG. 6, the UL subframe may be divided into a control region allocated to a physical uplink control channel (PUCCH) carrying UL control information and a data region allocated to a physical uplink shared channel (PUSCH) carrying user data. To maintain a single carrier property in a UL, consecutive RBs in a frequency domain are allocated to one UE. One UE cannot simultaneously transmit the PUCCH and the PUSCH.

The PUCCH for one UE is allocated to an RB pair in a subframe. RBs belonging to the RB pair occupy different subcarriers in each of the two slots. In this case, it is said that the RB pair allocated to the PUCCH is subject to frequency hopping at a slot boundary. In FIG. 6, m denotes a location index indicating a frequency domain location of an RB pair allocated to the PUCCH in the subframe.

The PUSCH is mapped to an uplink shared channel (UL-SCH) that is a transport channel. Examples of UL control information transmitted on the PUCCH include HARQ ACK/NACK, a CQI indicating a DL channel condition, an SR that is a UL radio resource allocation request, etc.

The PUCCH can support multiple formats. That is, it is possible to transmit the UL control information whose number of bits per subframe differs according to the modulation scheme. The following table shows an example of a modulation scheme and the number of bits per subframe with respect to a PUCCH format.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used to transmit the SR. A PUCCH format 1a/1b is used to transmit the HARQ ACK/NACK. A PUCCH format 2 is used to transmit the CQI. A PUCCH format 2a/2b is used to transmit the CQI and the HARQ ACK/NACK.

In any subframe, if the HARQ ACK/NACK is transmitted alone, the PUCCH format 1a/1b is used, and if the SR is transmitted alone, the PUCCH format 1 is used. The UE can transmit the HARQ ACK/NACK and the SR at the same subframe. For positive SR transmission, the UE transmits the HARQ ACK/NACK by using a PUCCH allocated for the SR. For negative SR transmission, the UE transmits the HARQ ACK/NACK by using a PUCCH resource allocated for the ACK/NACK.

Control information transmitted on the PUCCH uses a cyclically shifted sequence. The cyclically shifted sequence can be generated by cyclically shifting a base sequence by a specific cyclic shift (CS) amount. The specific CS amount is indicated by a CS index. Various types of sequences can be used as the base sequence. For example, well-known sequences (e.g., a pseudo-random (PN) sequence and a Zadoff-Chu (ZC) sequence) can be used as the base sequence. In addition, a constant amplitude zero auto-correlation (CAZAC) sequence generated by a computer can be used as the base sequence. The following equation shows an example of the base sequence.

$$r_i(n) = e^{jb(n)\pi/4} \quad \text{[Equation 1]}$$

Herein, i∈{0, 1, . . . , 29} denotes a root index, and n denotes an element index satisfying 0≤n≤N−1, where N is a length of the base sequence. i can be determined by a cell identity (ID) and a slot number in a radio frame or the like. If one RB includes 12 subcarriers, N may be set to 12. A different root index defines a different base sequence. If N=12, b(n) can be defined by the following table.

TABLE 2

| i | b(0), . . . , b(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | 3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A cyclically shifted sequence r(n, Ics) can be generated by cyclically shifting a base sequence r(n) according to the following equation.

$$r(n, I_{cs}) = r(n) \cdot \exp\left(\frac{j2\pi I_{cs} n}{N}\right), 0 \leq I_{cs} \leq N - 1 \quad \text{[Equation 2]}$$

Herein, Ics denotes a CS index indicating a CS amount ($0 \leq Ics \leq N-1$, where Ics is an integer).

Hereinafter, an available CS of the base sequence is defined as a CS that can be derived from the base sequence according to a CS unit. For example, if the base sequence has a length of 12 and the CS unit is 1, the total number of available CSs of the base sequence is 12. If the base sequence has a length of 12 and the CS unit is 2, the total number of available CSs of the base sequence is 6. The CS unit can be determined by considering a delay spread.

FIG. 7 shows an example of PUCCH format 1/1a/1b transmission if a normal CP is used. Herein, an RB pair allocated to a $1^{st}$ slot and a $2^{nd}$ slot in one subframe is shown.

Referring to FIG. 7, each of the $1^{st}$ slot and the $2^{nd}$ slot includes 7 SC-FDMA symbols. Among the 7 SC-FDMA symbols of each slot, a reference signal (RS) is carried on 3 SC-FDMA symbols, and control information is carried on the remaining 4 SC-FDMA symbols. The RS is carried on 3 contiguous SC-FDMA symbols positioned in a middle portion of each slot. In this case, the position and the number of symbols used for the RS may vary, and thus the position and the number of symbols used for the control information may also vary.

Each of the PUCCH formats 1, 1a, and 1b uses one complex-valued symbol d(0). A BS can detect an SR according to presence/absence of PUCCH transmission from a UE. Therefore, a specific value (e.g., d(0)=1) can be used as the complex-valued symbol d(0) for the PUCCH format 1. The complex-valued symbol d(0) for the PUCCH format 1a is generated if 1-bit HARQ ACK/NACK information is binary phase shift keying (BPSK) modulated. The complex-valued symbol d(0) for the PUCCH format 1b is generated if 2-bit HARQ ACK/NACK information is quadrature phase shift keying (QPSK) modulated.

A modulated sequence y(n) is generated based on the complex-valued symbol d(0) for the PUCCH format 1/1a/1b and the cyclically shifted sequence r(n,Ics). The modulated sequence y(n) can be generated by multiplying the complex-valued symbol d(0) by the cyclically shifted sequence r(n,Ics) according to the following equation.

$$y(n) = d(0) r(n, I_{cs}) \quad \text{[Equation 3]}$$

A CS index Ics of the cyclically shifted sequence r(n,Ics) may differ according to a slot number $n_s$ in a radio frame and an SC-FDMA symbol index l in a slot. Therefore, the CS index Ics can be expressed by Ics($n_s$,l). Herein, a slot number of the $1^{st}$ slot is set to 0, a slot number of the $2^{nd}$ slot is set to 1, and the CS index is set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE capacity, the modulated sequence y(n) can be spread by using an orthogonal sequence (OS). Herein, the modulated sequence y(n) is spread by using an OS w(k) having a spreading factor of K=4 with respect to 4 SC-FDMA symbols for carrying control information within one slot.

An OS $w_{Ios}(k)$ having a spreading factor of K=4 (where Ios is an OS index, $0 \leq k \leq K-1$) can use a sequence shown in the following table.

TABLE 3

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, the OS $w_{Ios}(k)$ having a spreading factor of K=3 (where Ios is an OS index, $0 \leq k \leq K-1$) can use a sequence shown in the following table.

TABLE 4

| Orthogonal Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OS index Ios may differ according to the slot number $n_s$ in the radio frame. Therefore, the OS index Ios can be expressed by Ios($n_s$).

The modulated sequence y(n) may be scrambled in addition to being spread using the OS. For example, the modulated sequence y(n) may be multiplied by 1 or j according to a specific parameter.

The RS can be generated based on the OS and the cyclically shifted sequence generated from the same base sequence as the control information. The cyclically shifted sequence can be used as the RS by spreading the cyclically shifted sequence with the OS w(k) having a spreading factor of K=3. Therefore, in order for the UE to transmit the control information, in addition to the OS index and the CS index for the control information, the OS index and the cyclically shifted index for the RS are also required.

Figure 8:
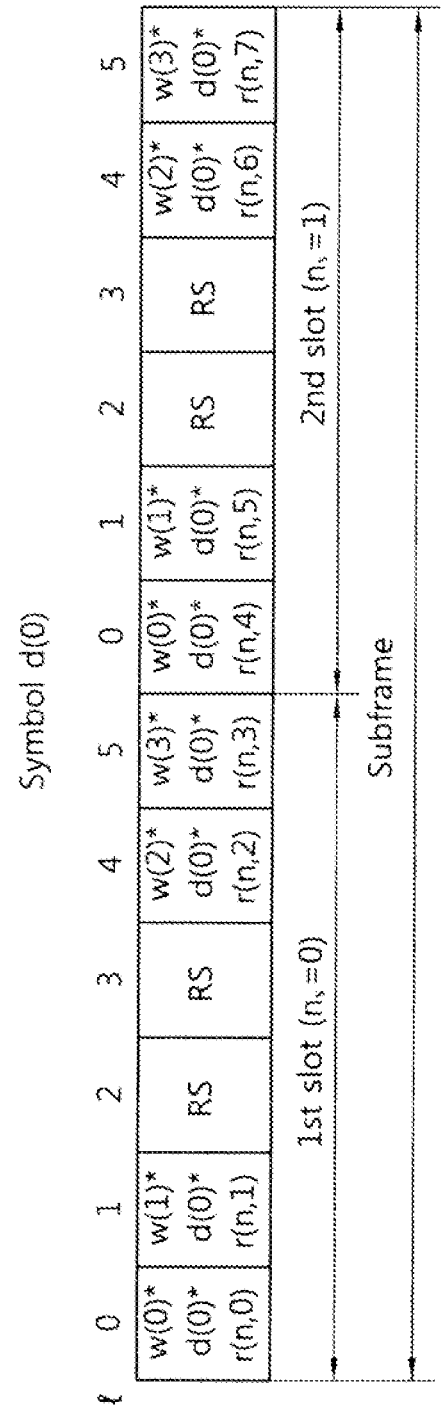
FIG. 8 shows an example of PUCCH format 1/1a/1b transmission if an extended CP is used.

FIG. 8 shows an example of PUCCH format 1/1a/1b transmission if an extended CP is used.

Referring to FIG. 8, each of a $1^{st}$ slot and a $2^{nd}$ slot includes 6 SC-FDMA symbols. Among the 6 SC-FDMA symbols of each slot, an RS is carried on 2 SC-FDMA symbols, and control information is carried on the remaining 4 SC-FDMA symbols. Other than that, the example of FIG. 8 in which the normal CP is used may be applied without alteration. However, the RS can be used by spreading the cyclically shifted sequence with the OS w(k) having a spreading factor of K=2.

An OS $w_{Ios}(k)$ having a spreading factor of K=2 (where Ios is an OS index, $0 \leq k \leq K-1$) can use a sequence shown in the following table.

TABLE 5

| Orthogonal sequence index | [w(0), w(1)] |
|---|---|
| 0 | [1 1] |
| 1 | [1 −1] |
| 2 | N/A |

As described above, for PUCCH format 1/1a/1b transmission, both of the normal CP and the extended CP require the following information. That is, a CS index Ics and an OS index Ios are required for the control information, and a CS index I'cs and an OS index I'os are required for the RS.

Hereinafter, a method of transmitting a sounding reference signal (SRS) will be described. The SRS is a reference signal transmitted for UL scheduling by a UE to a BS. The BS estimates a UL channel by using the received SRS, and uses the estimated UL channel in the UL scheduling.

FIG. 9 shows an example of a subframe for transmitting an SRS.

Referring to FIG. 9, the SRS is transmitted in one SC-FDMA symbol of the subframe. An SC-FDMA symbol of a duration in which the SRS is transmitted is hereinafter referred to as a sounding symbol. Herein, the sounding symbol is a last SC-FDMA symbol among 14 SC-FDMA symbols constituting the subframe. However, this is for exemplary purposes only, and thus the position and number of sounding symbols in the subframe may change variously.

The SRS is transmitted not in a control region but in a data region. The UE may transmit the SRS throughout the entire frequency (or subcarrier) of the data region or may transmit the SRS throughout a portion of the frequency of the data region. If the UE transmits the SRS throughout the portion of the frequency, the SRS may be transmitted throughout different frequencies by frequency hopping in each subframe for transmitting the SRS. Further, the UE may transmit the SRS by using only subcarriers of even (or odd) subcarrier indices. The UE may transmit the SRS periodically or aperiodically.

The SRS may generate based on a cyclically shifted sequence obtained by cyclically shifting a base sequence by a specific CS amount. A PN sequence, a ZC sequence, or a CAZAC sequence generated by a computer can be used as the base sequence.

An SRS of each of a plurality of UEs can be multiplexed by allowing each UE within a cell to differently use a CS amount, a subcarrier, or a subframe for transmitting the SRS.

The BS can transmit parameters for the SRS to the UE. The parameters may be information on an SRS transmission time, frequency information, CS amount information, etc. The information on the SRS transmission time may be a subframe for transmitting the SRS, a transmission period, etc. The frequency information may be a subcarrier index, the number of RBs for transmitting the SRS, etc. The parameters may be set by a higher layer (e.g., radio resource control (RRC)).

The subframe for transmitting the SRS may overlap with a subframe for transmitting control information on a PUCCH. For example, if the UE transmits the CQI, the SR, and the SRS according to respective transmission periods, a subframe for transmitting the SR may overlap with the subframe for transmitting the SRS. In this case, which operation will be performed by the UE is problematic since one UE cannot simultaneously transmit the PUCCH and a PUSCH.

In the 3GPP LTE, if SRS transmission and PUCCH transmission carrying CQI happen to coincide in a same subframe, the UE shall not transmit the SRS. If SRS transmission and PUCCH transmission carrying SR happen to coincide in a same subframe, the UE shall not transmit the SRS.

If SRS transmission and PUCCH transmission carrying ACK/NACK happen to coincide in a same subframe, the UE may not transmit the SRS. Alternatively, the UE may support simultaneous transmission of the ACK/NACK on a PUCCH and the SRS by using a shortened ACK/NACK format of the ACK/NACK.

Figure 10:
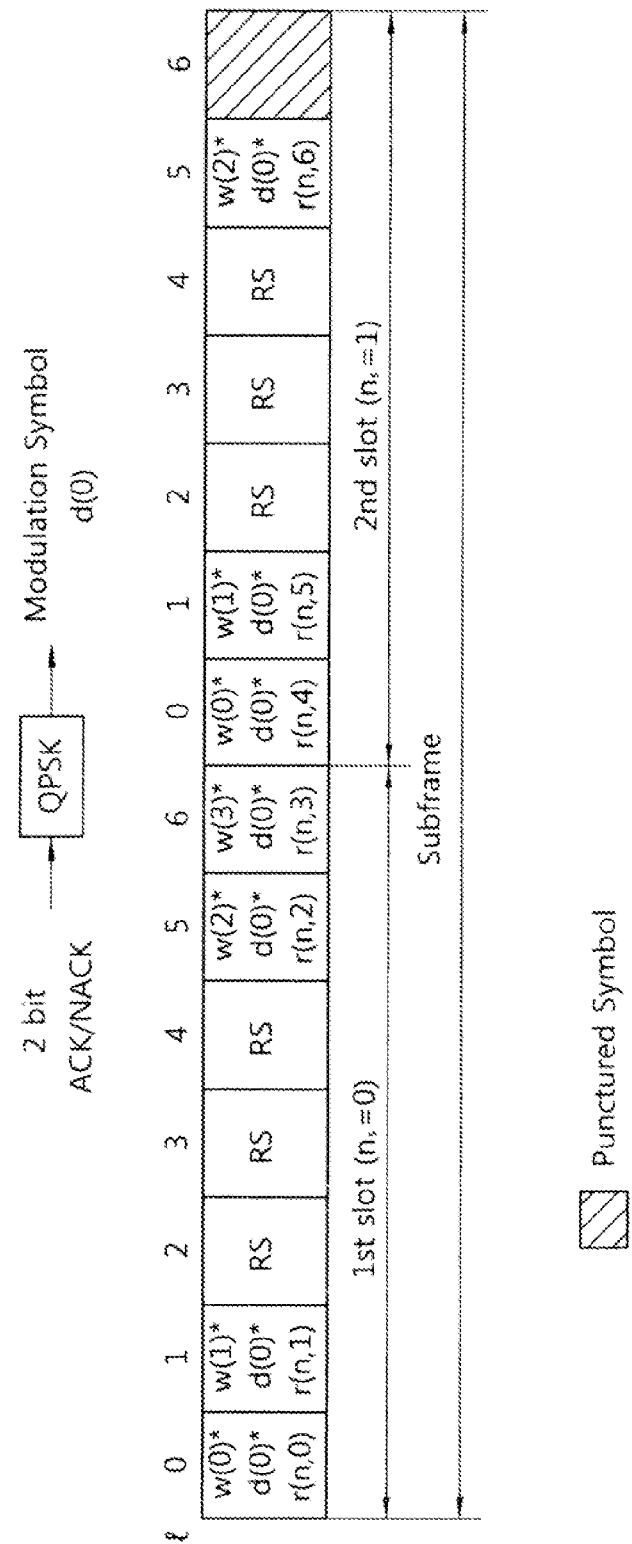
FIG. 10 shows an example of transmission for a shortened ACK/NACK format if a normal CP is used.
Figure 11:
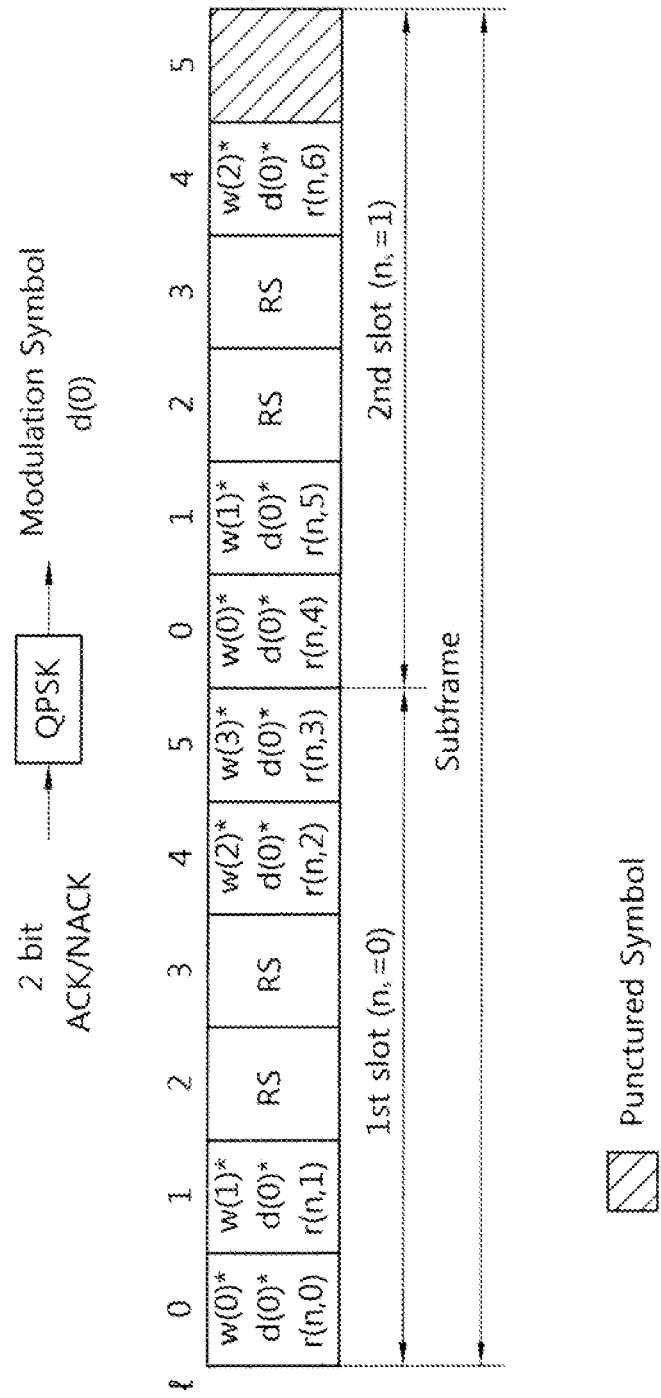
FIG. 11 shows an example of transmission for a shortened ACK/NACK format if an extended CP is used.

FIG. 10 shows an example of transmission for a shortened ACK/NACK format if a normal CP is used. FIG. 11 shows an example of transmission for a shortened ACK/NACK format if an extended CP is used.

Referring to FIGS. 10 and 11, 2-bit ACK/NACK information is QPSK modulated to generate one modulated symbol d(0). Alternatively, 1-bit ACK/NACK information may be QPSK modulated to generate one modulated symbol d(0). A last SC-FDMA symbol of a $2^{nd}$ slot in a subframe is punctured. An SRS may be transmitted in a duration corresponding to the punctured symbol. That is, the punctured symbol corresponds to a location at which the SRS is transmitted. A $1^{st}$ slot is the same as in FIG. 7 or 8. In the $2^{nd}$ slot, control information is carried on three SC-FDMA symbols. An orthogonal sequence having a spreading factor of K=3 is used for the three SC-FDMA symbols. That is, the $1^{st}$ slot is asymmetric to the $2^{nd}$ slot. Hereinafter, the PUCCH format of FIGS. 7 and 8, which is differentiated from the shortened ACK/NACK format, is referred to as a normal PUCCH format.

However, in a subframe for transmitting ACK/NACK by using the shortened ACK/NACK format, a problem may occur if another UE transmits an SR based on the normal PUCCH format. Hereinafter, the SR based on the normal PUCCH format is referred to as a normal SR.

Each of a plurality of UEs within a cell can simultaneously transmit the control information to the BS. In this case, if the respective UE use different PUCCH resources, the BS can distinguish the control information of the respective UEs. The PUCCH resource is a resource used to transmit the control information on a PUCCH. The PUCCH resource is identified by a PUCCH resource index. A CS index and a frequency for PUCCH transmission are determined by the PUCCH resource index. An orthogonal sequence index for the PUCCH transmission may also be determined by the PUCCH resource index. Hereinafter, $n^{(1)}_{PUCCH}$ denotes a first PUCCH resource index and is a PUCCH resource index for the PUCCH format 1/1a/1b. In addition, $n^{(2)}_{PUCCH}$ denotes a second PUCCH resource index and is a PUCCH resource index for the PUCCH format 2/2a/2b.

Figure 12:
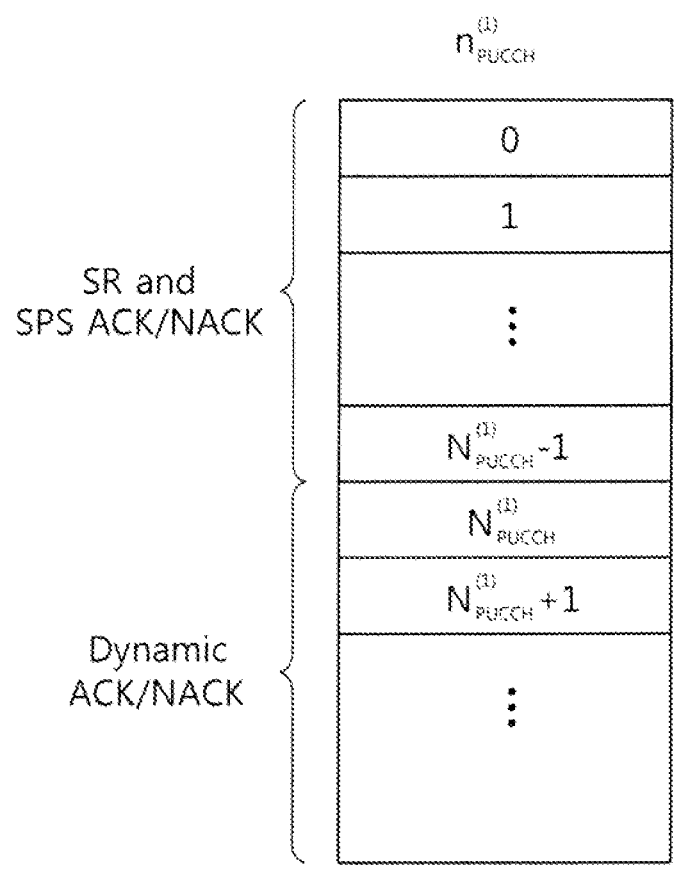
FIG. 12 shows an example of allocating first PUCCH resource indices.

FIG. 12 shows an example of allocating first PUCCH resource indices.

Referring to FIG. 12, $N^{(1)}_{PUCCH}$ first PUCCH resource indices (e.g., $n^{(1)}_{PUCCH}=0, \ldots, N^{(1)}_{PUCCH}-1$) are allocated for an SR and semi-persistent scheduling (SPS) ACK/NACK. The SPS ACK/NACK is ACK/NACK for DL data transmitted based on SPS. If the DL data is transmitted on a PDSCH, a PDCCH corresponding to the PDSCH may not exist.

A BS reports various parameters to a UE. Examples of the parameters include $N^{(1)}_{PUCCH}$, an SR index that is a first PUCCH resource index for the SR, an SPS ACK/NACK index that is a first PUCCH resource index for the SPS ACK/NACK. The parameters may be set by a higher layer (e.g., RRC). The parameter $N^{(1)}_{PUCCH}$ is common to all UEs within a cell. The SR index and the SPS ACK/NACK index are UE-specific parameters.

The remaining first PUCCH resource indices are allocated for a dynamic ACK/NACK. These indices are referred to as dynamic ACK/NACK indices. That is, the dynamic ACK/NACK indices are allocated consecutively with respect to the SR index and the SPS ACK/NACK index. The dynamic ACK/NACK is ACK/NACK for DL data transmitted based on dynamic scheduling. A first PUCCH resource index for the dynamic ACK/NACK can be determined using the parameter $N^{(1)}_{PUCCH}$ and a resource for transmitting a control channel used for DL data scheduling. For example, the control channel may be a PDCCH.

Figure 13:
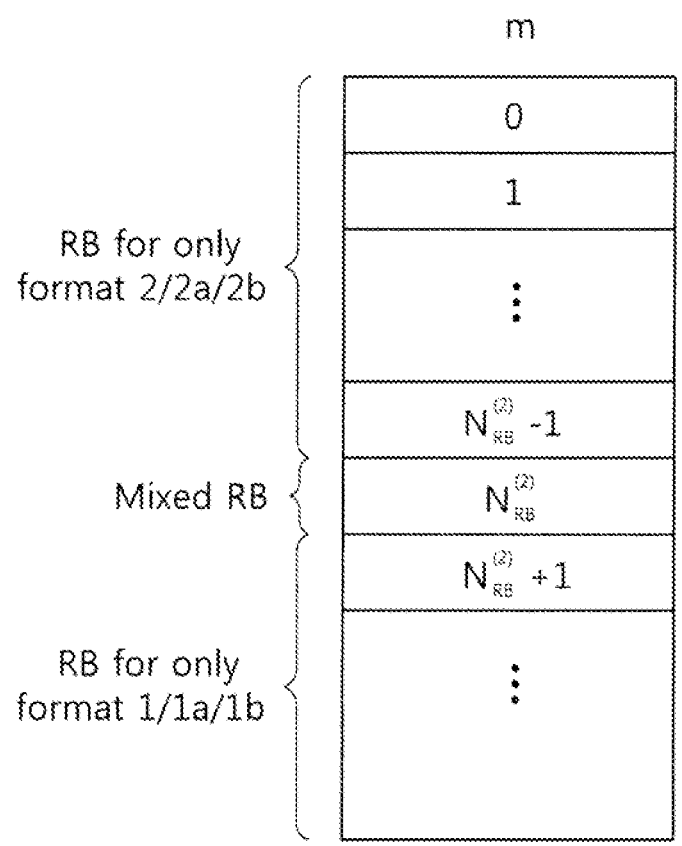
FIG. 13 shows an example of a resource block (RB) allocated to a PUCCH.

FIG. 13 shows an example of an RB allocated to a PUCCH.

Referring to FIG. 13, m denotes a location index indicating a location of the RB allocated to the PUCCH along a frequency domain in a subframe (see FIG. 6). $N^{(2)}_{RB}$ RBs (e.g., m=0, ..., $N^{(2)}_{RB}-1$) are used in transmission only for the PUCCH format 2/2a/2b. A BS can report a parameter $N^{(2)}_{RB}$ to a UE. An RB of m=$N^{(2)}_{RB}$ is a mixed RB. The mixed RB is an RB used to mix the PUCCH format 1/1a/1b and the PUCCH format 2/2a/2b. The number of RBs that can be supported as the mixed RB is less than or equal to one within each slot. An RB received from the BS can be multiplexed with UL control information of each of a plurality of UEs within the cell. In the mixed RB, different types of control information can be multiplexed. For example, if one UE transmits an SR through the mixed RB, another UE within a cell can transmit a CQI through the mixed RB. $N^{(1)}_{CS}$ denotes the number of CSs used for the PUCCH format 1/1a/1b within a mixed RB. The remaining RBs are used in transmission only for the PUCCH format 1/1a/1b. That is, the mixed RB and subsequent RBs are used for ACK/NACK transmission or SR transmission.

The UE can obtain an RB (or subcarrier) allocated to the PUCCH from a PUCCH resource index. The location index m in the subframe can be obtained by the following equation.

[Equation 4]

for formats 1, 1a and 1b $$m = \begin{cases} N^{(2)}_{RB} & \text{if } n^{(1)}_{PUCCH} < c \cdot N^{(1)}_{cs}/\Delta_{shift} \\ \left\lfloor \frac{n^{(1)}_{PUCCH} - c \cdot N^{(1)}_{cs}/\Delta_{shift}}{c \cdot N^{(1)}_{cs}/\Delta_{shift}} \right\rfloor + N^{(2)}_{RB} + \left\lceil \frac{N^{(1)}_{cs}}{8} \right\rceil & \text{otherwise} \end{cases}$$

for formats 2, 2a and 2b $$m = \lfloor n^{(2)}_{PUCCH}/N \rfloor$$

where $$c = \begin{cases} 3 & \text{normal cyclic prefix} \\ 2 & \text{extended cyclic prefix} \end{cases}$$

$\Delta_{shift} \in \{1,2,3\}$

Herein, N denotes the number of subcarriers included in the RB.

The shortened ACK/NACK format can be used as a cell basis or a subframe basis. In this case, all UEs within the cell or all UEs within one subframe naturally use a shortened ACK/NACK or SR. The shortened ACK/NACK format can be used as an RB basis. In this case, if a normal SR format and the shortened ACK/NACK format are used in one subframe, an RB for transmission of the normal SR has to be physically separated from an RB for transmission of the shortened ACK/NACK format. This is to maintain orthogonality between SR using the normal SR format and ACK/NACK using the shortened ACK/NACK format.

However, as described above, although an SR index is distinguished logically from a dynamic ACK/NACK index, the SR index is not distinguished physically from the dynamic ACK/NACK index. This is because, although the SR index and the dynamic ACK/NACK index have different values, the SR index and the dynamic ACK/NACK index can be allocated to the same RB. Therefore, to use both the normal SR format and the shortened ACK/NACK format, there is a need to allocate a new RB for the dynamic ACK/NACK separated from the RB for the SR. In this case, the new RB is allocated irrespective of whether the RB for the SR is fully used by the SR index. This causes waste of RBs. If $\Delta_{shift}$ is 1, up to 36 first PUCCH resource indices can be used for one RB. If one RB uses only one SR index and a new RB for a dynamic ACK/NACK is allocated, 35 indices are wasted in that RB which uses one SR index. In the case of using a system in which a subframe includes 6 RBs in a frequency domain, up to about 25% of wastes of resource indices occurs in one RB.

The aforementioned problems can be easily solved by using a shortened SR format having the same structure as the shortened ACK/NACK format.

Figure 14:
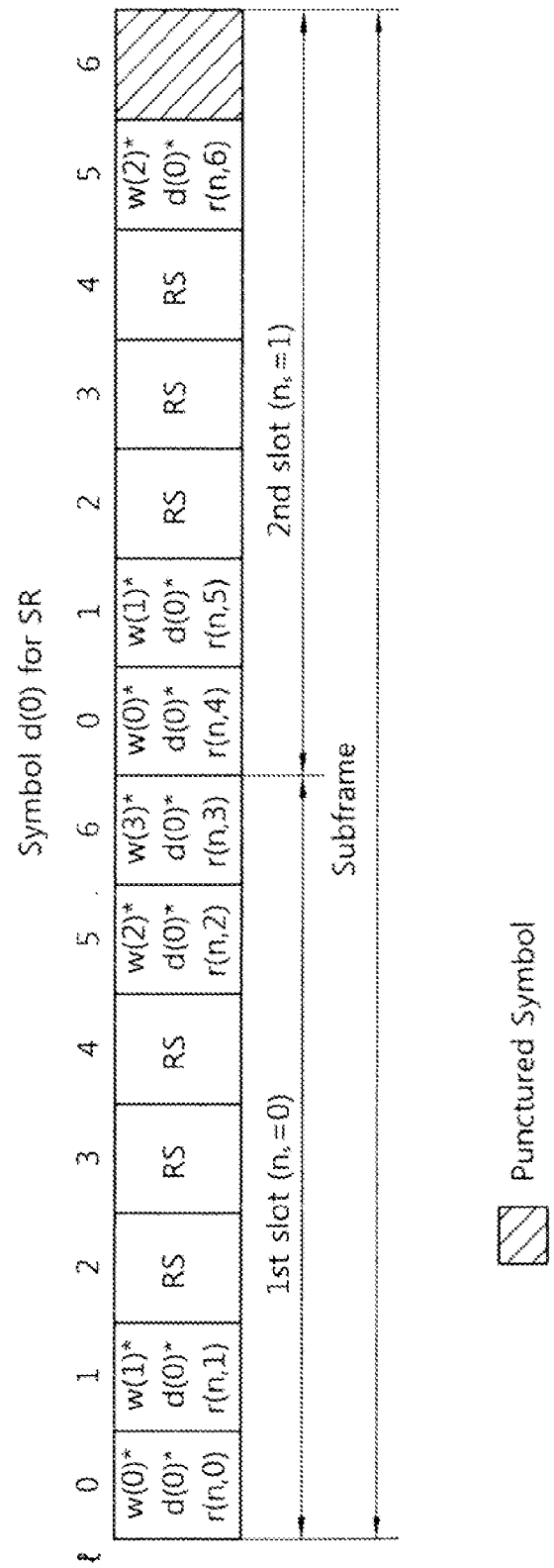
FIG. 14 shows an example of transmission for a shortened scheduling request (SR) format if a normal CP is used.
Figure 15:
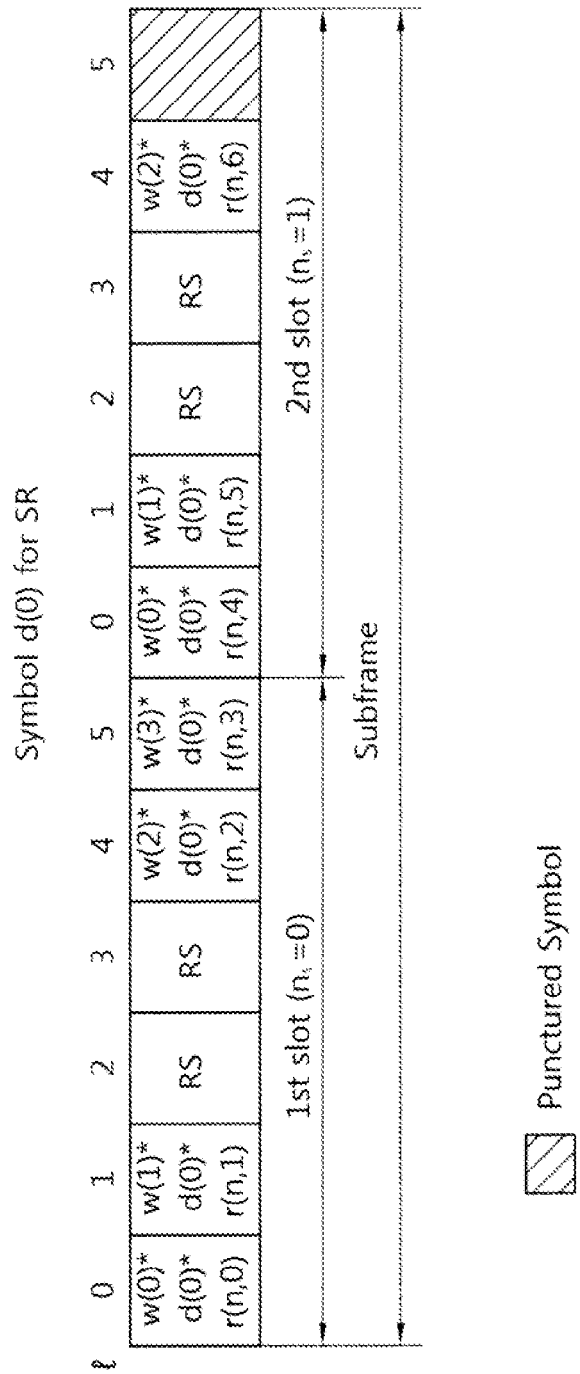
FIG. 15 shows an example of transmission for a shortened SR format if an extended CP is used.

FIG. 14 shows an example of transmission for a shortened SR format if a normal CP is used. FIG. 15 shows an example of transmission for a shortened SR format if an extended CP is used.

Referring to FIGS. 14 and 15, one symbol d(0) is used for an SR. A BS can detect an SR according to presence/absence of PUCCH transmission from a UE. Therefore, a specific value (e.g., d(0)=1) can be used as the complex-valued symbol d(0) for the PUCCH format 1. That is, unlike the ACK/NACK, the SR is not subjected to a process of modulating binary information. In this case, the SR is transmitted based on a first PUCCH resource index allocated for the SR. That is, the UE determines an orthogonal sequence index, a CS index and a location of an RB from the first PUCCH resource index, and transmits the SR.

A last SC-FDMA symbol of a $2^{nd}$ slot in a subframe is punctured. An SRS may be transmitted in a duration corresponding to the punctured symbol. A $1^{st}$ slot is the same as in FIG. 7 or 8. In the $2^{nd}$ slot, control information is carried on three SC-FDMA symbols. An orthogonal sequence having a spreading factor of K=3 is used for the three SC-FDMA symbols. That is, the $1^{st}$ slot is asymmetric to the $2^{nd}$ slot.

As such, since the shortened SR format has the same format as the shortened ACK/NACK format, there is no system overhead for implementing the shortened SR format. Further, since one UE can simultaneously transmit the SR and the SRS, limited radio resources can be effectively used. Furthermore, it is possible to avoid a situation where the SRS is not transmitted at a proper time. If the shortened ACK/NACK format is configured, the shortened SR format can be configured for effective use of the first PUCCH resource. In addition, if the normal ACK/NACK format is configured, the normal SR format can be configured. Accordingly, the SR and the ACK/NACK can use the same format and thus orthogonality between the SR and the ACK/NACK can be maintained. In addition, since the ACK/NACK and the SR are simultaneously configured in the same type of formats, scheduling complexity can be reduced. Therefore, the SR can be effectively transmitted, and overall system performance can be improved.

Figure 16:
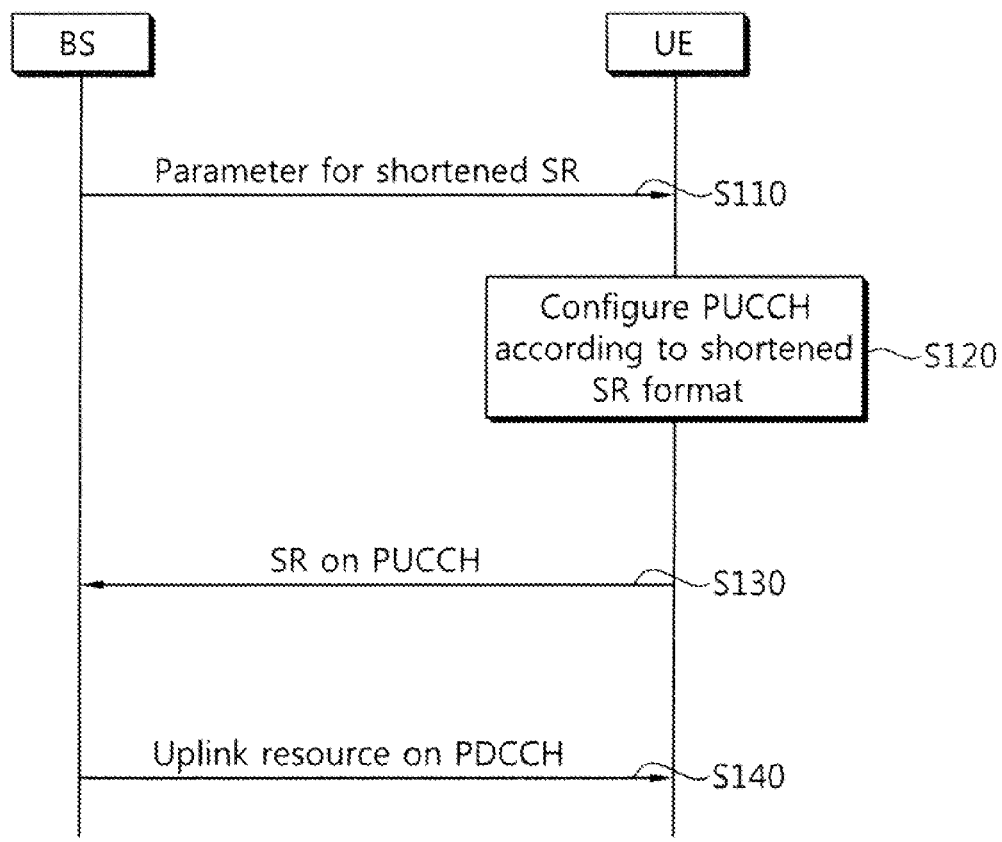
FIG. 16 is a flow diagram showing an example of a method of transmitting uplink control information by using a shortened SR format.

FIG. 16 is a flow diagram showing an example of a method of transmitting UL control information by using a shortened SR format.

Referring to FIG. 16, a BS transmits parameters for a shortened SR to a UE (step S110). Examples of the parameters for the SR include a simultaneous transmission indicator and a specific subframe configuration parameter. The parameters may be common to all UEs within a cell. The parameters for the shortened SR may be transmitted together with parameters for an SRS. The parameters for the shortened SR can be configured by a higher layer (e.g., RRC).

The simultaneous transmission indicator indicates whether simultaneous transmission of an SR and/or ACK/NACK and an SRS is supported. If the simultaneous transmission indicator supports simultaneous transmission, the UE can use the shortened ACK/NACK format and the shortened SR format. That is, it can be seen that the simultaneous transmission indicator indicates whether one SC-FDMA symbol on a PUCCH is punctured.

The specific subframe configuration parameter indicates a subframe in which the shortened ACK/NACK format and the shortened SR format are transmitted. The UE can use the shortened SR format only in a specific subframe indicated by the specific subframe configuration parameter. That is, it can be seen that the specific subframe configuration parameter indicates a specific subframe in which one SC-FDMA symbol on a PUCCH is punctured.

The UE configures the PUCCH in the specific subframe according to the shortened SR format (step S120). The UE transmits the SR of the shortened SR format on the PUCCH (step S130). In this case, even if the SRS is not transmitted at a specific subframe, the UE transmits the SR of the shortened SR format. The BS transmits a UL resource on a PDCCH to the UE (step S140). The UL resource is a response for the SR.

The following table shows an example of a period of a specific subframe indicated by the specific subframe configuration parameter and a specific subframe offset.

TABLE 6

| Specific subframe configuration | Period | Offset |
|---|---|---|
| 0 | 1 | {0} |
| 1 | 2 | {0} |
| 2 | 2 | {1} |
| 3 | 5 | {0} |
| 4 | 5 | {1} |
| 5 | 5 | {2} |
| 6 | 5 | {3} |
| 7 | 5 | {0, 1} |
| 8 | 5 | {2, 3} |
| 9 | 10 | {0} |
| 10 | 10 | {1} |

TABLE 6-continued

| Specific subframe configuration | Period | Offset |
|---|---|---|
| 11 | 10 | {2} |
| 12 | 10 | {3} |
| 13 | 10 | {0, 1, 2, 3, 4, 6, 8} |
| 14 | 10 | {0, 1, 2, 3, 4, 5, 6, 8} |
| 15 | Inf | N/A |

Herein, the specific subframe is a subframe satisfying the following equation.

$$\lfloor n_s/2 \rfloor \bmod T_{SFC} \in \Delta_{SFC} \qquad \text{[Equation 5]}$$

Herein, $n_s$ denotes a slot number within a radio frame, $T_{SFC}$ denotes a period of a specific frame, and $\Delta_{SFC}$ denotes a specific subframe offset.

Figure 17:
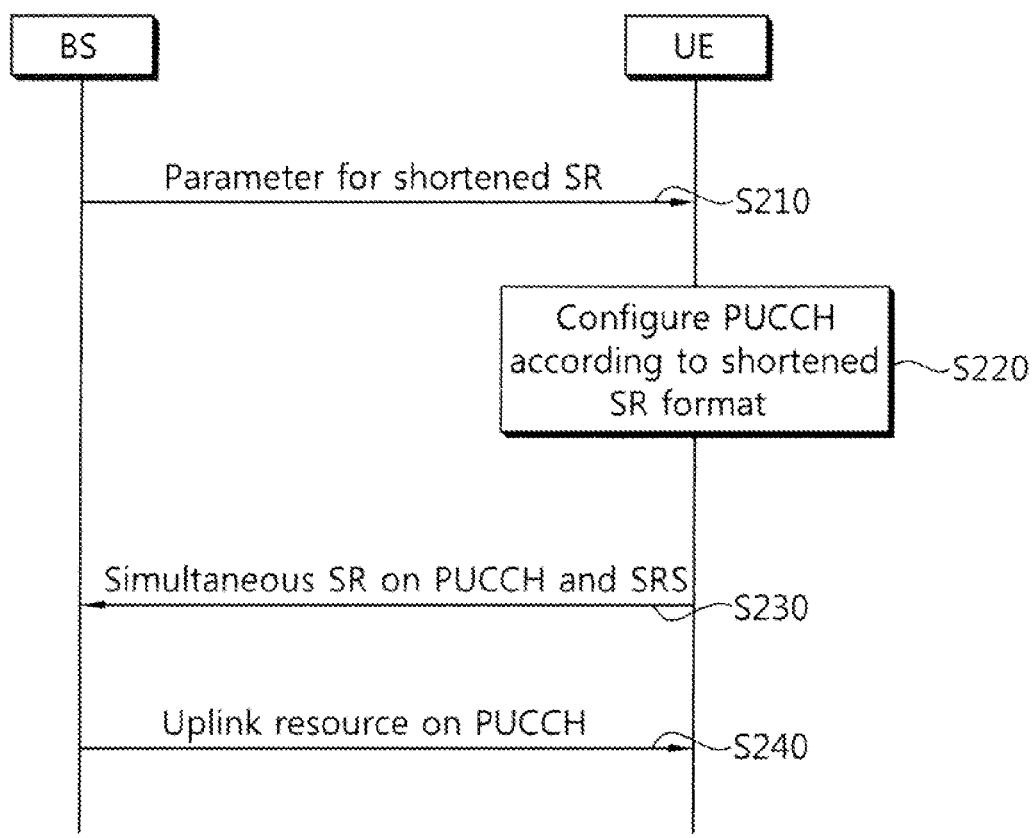
FIG. 17 is a flow diagram showing another example of a method of transmitting uplink control information by using a shortened SR format.

FIG. 17 is a flow diagram showing another example of a method of transmitting UL control information by using a shortened SR format.

Referring to FIG. 17, a BS transmits parameters for a shortened SR to a UE (step S210). The UE configures the PUCCH in the specific subframe indicated by the parameters according to the shortened SR format (step S220). The UE simultaneously transmits an SRS and an SR of the shortened SR format on the PUCCH (step S230). The BS transmits a UL resource on a PDCCH to the UE (step S240).

Figure 18:
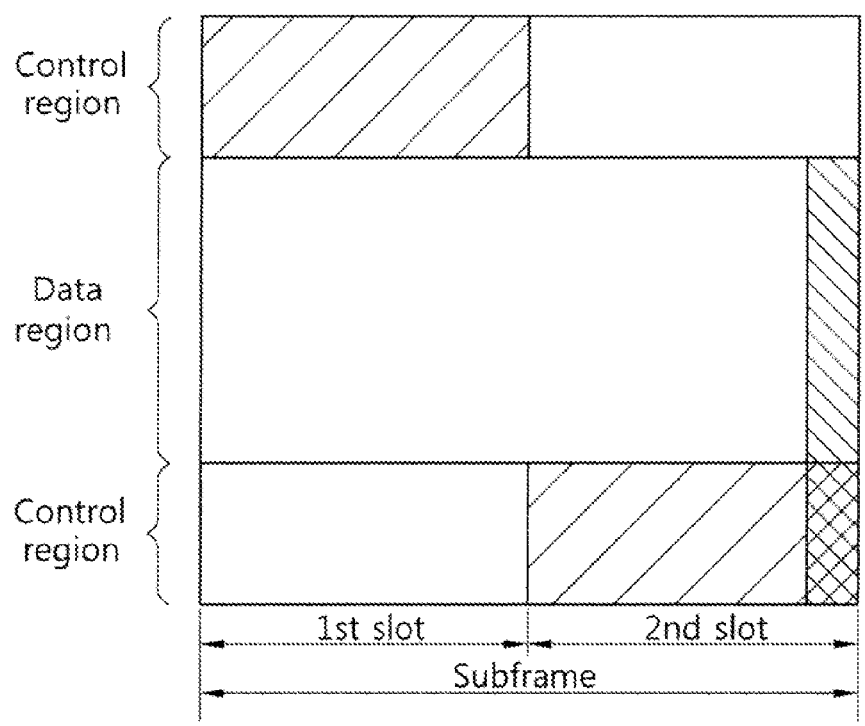
FIG. 18 shows an example of transmission of an SR and an SRS at a specific subframe.

FIG. 18 shows an example of transmission of an SR and an SRS at a specific subframe.

Referring to FIG. 18, a UE punctures one SC-FDMA symbol in a duration in which the SRS is transmitted. Accordingly, the UE can simultaneously transmit an SRS and an SR of the shortened SR format.

Figure 19:
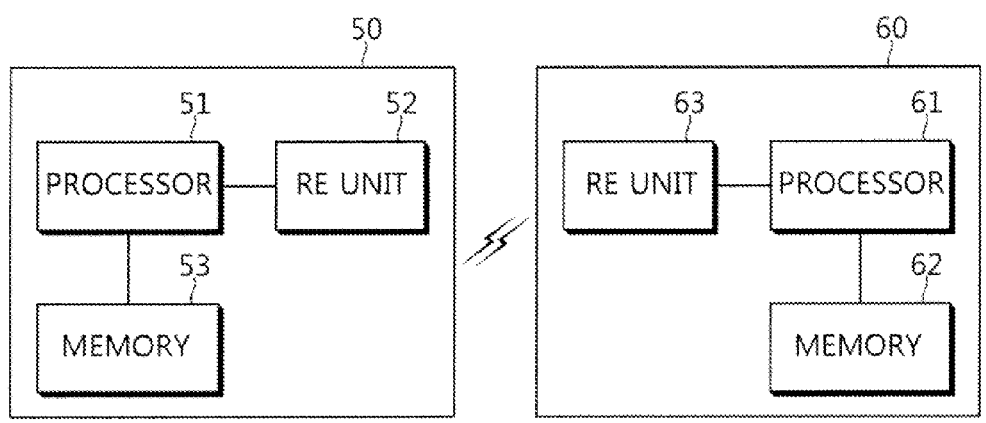
FIG. 19 is a block diagram showing wireless communication system to implement an embodiment of the present invention.

FIG. 19 is a block diagram showing wireless communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit, data processing device and/or converter which converts a baseband signal into a radio signal and vice versa. The memories 52, 62 may include read-only memory (ROM), random access memory (RAM), flash memory, memory card, storage medium and/or other storage device. The RF units 53, 63 include one or more antennas which transmit and/or receive a radio signal. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a scheduling request (SR), the method performed by a mobile terminal and comprising:
   receiving a sounding reference signal (SRS) configuration to determine a SRS subframe;
   receiving a simultaneous transmission indicator indicating whether the mobile terminal is configured to support a transmission of a SRS and a hybrid automatic repeat request (HARQ) acknowledgement/not-acknowledgment (ACK/NACK) on a physical uplink control channel (PUCCH) in one subframe; and
   transmitting the SRS and a SR in the SRS subframe, if the mobile terminal is configured to support the transmission of the SRS and the HARQ ACK/NACK on the PUCCH in the one subframe,
   wherein the SRS subframe includes a plurality of single carrier-frequency division multiple access (SC-FDMA) symbols, and
   wherein the SRS is transmitted in a last SC-FDMA symbol of the SRS subframe and the SR is transmitted in remaining SC-FDMA symbols of the SRS subframe.

2. The method of claim 1, wherein the last SC-FDMA symbol is used for the SRS is a punctured SC-FDMA symbol.

3. The method of claim 1, further comprising:
   transmitting the HARQ ACK/NACK on the PUCCH in the SRS subframe.

4. A mobile terminal configured to transmit a scheduling request (SR), the mobile terminal comprising:
   a radio frequency (RF) unit configured to transmit and receive a radio signal; and
   a processor coupled with the RF unit and configured to:
   receive, via the RF unit, a sounding reference signal (SRS) configuration to determine a SRS subframe;
   receive, via the RF unit, a simultaneous transmission indicator indicating whether the mobile terminal is configured to support a transmission of a SRS and a hybrid automatic repeat request (HARQ) acknowledgement/not-acknowledgment (ACK/NACK) on a physical uplink control channel (PUCCH) in one subframe; and
   transmit, via the RF unit, the SRS and a SR in the SRS subframe, if the mobile terminal is configured to support the transmission of the SRS and the HARQ ACK/NACK on the PUCCH in the one subframe,
   wherein the SRS subframe includes a plurality of single carrier-frequency division multiple access (SC-FDMA) symbols, and
   wherein the SRS is transmitted in a last SC-FDMA symbol of the SRS subframe and the SR is transmitted in remaining SC-FDMA symbols of the SRS subframe.

5. The mobile terminal of claim 4, wherein the last SC-FDMA symbol is used for the SRS is a punctured SC-FDMA symbol.

6. The mobile terminal of claim 4, wherein the HARQ ACK/NACK is transmitted on the PUCCH in the SRS subframe.

* * * * *